United States Patent
Kamachi et al.

[11] Patent Number: 6,152,319
[45] Date of Patent: Nov. 28, 2000

[54] THERMALLY INSULATED SYNTHETIC RESIN CONTAINER AND THERMALLY INSULATED SYNTHETIC RESIN LID

[75] Inventors: Hidefumi Kamachi; Masashi Yamada; Takafumi Fujii; Kensuke Furuyama; Atsuhiko Tanaka, all of Tokyo, Japan

[73] Assignee: Nippon Sanso Corporation, Tokyo, Japan

[21] Appl. No.: 09/101,260

[22] PCT Filed: Nov. 13, 1997

[86] PCT No.: PCT/JP97/04131

§ 371 Date: Jun. 29, 1998

§ 102(e) Date: Jun. 29, 1998

[87] PCT Pub. No.: WO98/22007

PCT Pub. Date: May 28, 1998

[30] Foreign Application Priority Data

Nov. 22, 1996 [JP] Japan ................................. 8-312360

[51] Int. Cl.⁷ .................................................. B65D 90/00
[52] U.S. Cl. .................................... 220/592.2; 220/62.18; 220/592.21; 220/592.27
[58] Field of Search ........................... 220/592.2, 592.21, 220/592.25, 592.27, 592.09, 592.1, 592.11, 62.18

[56] References Cited

U.S. PATENT DOCUMENTS

| | | | |
|---|---|---|---|
| 4,847,459 | 7/1989 | Desai | 220/592.2 X |
| 4,981,234 | 1/1991 | Slaughter | 220/592.2 X |
| 4,984,707 | 1/1991 | Fierthaler | 220/592.2 X |

FOREIGN PATENT DOCUMENTS

| | | |
|---|---|---|
| 0763483A1 | 3/1997 | European Pat. Off. |
| 6-46572 | 6/1994 | Japan |
| 9-98892 | 4/1997 | Japan |
| 9-140537 | 6/1997 | Japan |
| WO98/22007 | 5/1998 | WIPO |

*Primary Examiner*—Steven Pollard
*Attorney, Agent, or Firm*—Darby & Darby

[57] ABSTRACT

The present invention relates to a thermally insulated synthetic resin container, which is a thermally insulated container having a double walled structure and being made of synthetic resin, which reduces the thermal conduction loss from the mouth portion, and which has excellent thermally insulating performance capabilities.

The thermally insulated synthetic resin container 1 of the present invention has an inner container 4 and an outer container 3, which are both made of synthetic resin and which are both connected at their respective mouth portions 12, 11 while providing a space portion in between the two containers. According to this thermally insulated synthetic resin container which is formed by having the space portion between the inner container 4 and the outer container 3 be a thermally insulating layer 6, a reduced thermal conductive portion 14 having a wall of reduced thickness is formed in the vicinity of the mouth portion 12 of the inner container 4.

6 Claims, 2 Drawing Sheets

THERMALLY INSULATED SYNTHETIC RESIN CONTAINER AND THERMALLY INSULATED SYNTHETIC RESIN LID

TECHNICAL FIELD

The present invention relates to thermally insulated containers and thermally insulated lids which are used for thermos bottles, cooler boxes, ice boxes, rice bowls, soup bowls, thermally insulated cups, thermally insulated lunch boxes, and the like. More specifically, the present invention relates to thermally insulated synthetic resin containers and thermally insulated synthetic resin lids which minimize the thermal conduction loss from the mouth portion of the containers or the edge portion of the lids due to thermal conduction.

This application is based on Japanese Patent Application No. Hei 8-312360 filed in Japan, the content of which is incorporated herein by reference.

BACKGROUND ART

Up to the present, for thermally insulated containers which can be used as thermos bottles, thermally insulated lunch boxes, and the like, development of thermally insulated synthetic resin containers, which have the advantages of being light weight and easily molded, and having low manufacturing costs, have been progressing. As this type of thermally insulated synthetic resin containers, a container having a lid which can be fitted thereto having the following structure has been proposed. The thermally insulated container has an inner container and an outer container formed of synthetic resin. The inner container is combined with the outer container, which is dimensionally larger than the inner container, while leaving a space between the two containers. The inner container and the outer container are joined at the mouth portions to form a double wall structured container. A gas having a low thermal conductivity comprising at least one gas from a group consisting of xenon, krypton, and argon is filled in the space formed between the inner container and the outer container. In the same manner, the thermally insulated lid has a top surface wall and a bottom surface wall formed of synthetic resin. The top surface wall is combined with the bottom surface wall, while leaving a space between the two walls. The top surface wall and the bottom surface wall are joined at the edge portions to form a double wall structured lid. Preferably, gas having a low thermal conductivity comprising at least one gas from a group consisting of xenon, krypton, and argon is filled in the space formed between the top surface wall and the bottom surface wall.

As for these types of thermally insulated containers or lids, so as to improve the effects of the thermal insulation, in addition to the insertion of the gas having low thermal conductivity into the thermal insulation layer, a metallic foil is disposed at least on the surface of the side of the thermal insulation layer of the inner container or the bottom surface wall in order to prevent heat loss due to thermal radiation. Either of these methods are intended to improve the thermal insulation in the direction of the thickness of the thermal insulation layer.

However, in the case where the contents to be thermally insulated is stored and thermally insulated inside of this type of thermally insulated container with a lid placed on top, heat is transmitted along the wall of the inner container from the area which is in contact with the contents to the mouth portion of the inner container, and the thermal conduction loss from the mouth portion of the inner container due to heat loss occurring from this mouth portion of the inner container to the outside of the container cannot be ignored. In the same manner, it is necessary to consider the conduction loss from the peripheral portion of the bottom surface wall facing the storage space for the contents. The thermal conduction loss from the mouth portion of the inner container or the peripheral portion of the bottom surface wall cannot be reduced by such methods as making each thermal insulation layers thicker, or filling gases having low thermal conductivity into the thermal insulation layers, or disposing metallic foil on the surface of the side of the thermal insulation layer of the inner container or the bottom surface wall. In addition, especially in the case where the thermally insulated container is made to have a wide rim, the amount of thermal conduction loss from the mouth portion of the container increases, and in conventional models of the thermally insulated containers, there was a possibility that the heat retaining performance capabilities or the cold retaining performance capabilities were insufficient.

DISCLOSURE OF INVENTION

The present invention proposes to offer a thermally insulated synthetic resin container which reduces the thermal conduction loss from the mouth portion of the container and a thermally insulated synthetic resin lid which reduces the thermal conduction loss from the peripheral portion of the lid.

The thermally insulated synthetic resin container of the present invention has an inner container and an outer container, which are both made of synthetic resin and which are both connected at their respective mouth portions while providing a space portion in between the two containers. According to this thermally insulated synthetic resin container which is formed by having the space portion between the inner container and the outer container be a thermally insulating layer, a reduced thermal conductive portion having a wall of reduced thickness is formed in the vicinity of the mouth portion of the inner container.

The thermally insulating layer may comprise a gas having low thermal conductivity which has a thermal conductivity lower than that of air.

A metallic foil may be provided on the surface of the inner container facing the thermally insulating layer excluding the part comprising the reduced thermal conductive portion.

The thermally insulated synthetic resin lid of the present invention has a top surface wall and a bottom surface wall, which are both made of synthetic resin and which are both connected at their respective peripheral portions while providing a space portion in between the two walls. According to this thermally insulated synthetic resin lid which is formed by having the space portion between the top surface wall and the bottom surface wall be a thermally insulating layer, a reduced thermal conductive portion having a wall of reduced thickness is formed in the vicinity of the peripheral portion of the bottom surface wall.

The thermally insulating layer may comprise a gas having low thermal conductivity which has a thermal conductivity lower than that of air.

A metallic foil may be provided on the surface of the bottom surface wall facing the thermally insulating layer excluding the part comprising the reduced thermal conductive portion.

BEST MODE FOR CARRYING OUT THE INVENTION

The thermally insulated synthetic resin container (hereinafter referred to as "thermally insulated container") and the thermally insulated synthetic resin lid (hereinafter referred to as "thermally insulated lid") of the present invention reduces the amount of thermal conduction per unit of time (the thermal conductive speed) to the mouth portion of the inner container or the peripheral portion of the bottom surface wall, by providing a reduced thermal conductive portion having a wall of reduced thickness in the vicinity of the mouth portion of the inner container which is in contact with the contents or in the vicinity of the peripheral portion of the bottom surface wall facing the storage space portion of the inner container.

With respect to the reduced thermal conductive portion of the thermally insulated container of the present invention, "having a wall of reduced thickness" denotes forming the central area of the reduced thermal conductive portion with a thickness thinner than the lower side or both sides (the upper side and the lower side) of the area comprising the reduced thermal conductive portion. In the same manner, with respect to the reduced thermal conductive portion of the thermally insulated lid of the present invention, "having a wall of reduced thickness" denotes forming the central area of the reduced thermal conductive portion with a thickness thinner than the central side or both sides (the central side and the peripheral side) of the area comprising the reduced thermal conductive portion.

The present invention will be explained in further detail below, with reference to the drawings.

Figure 1:
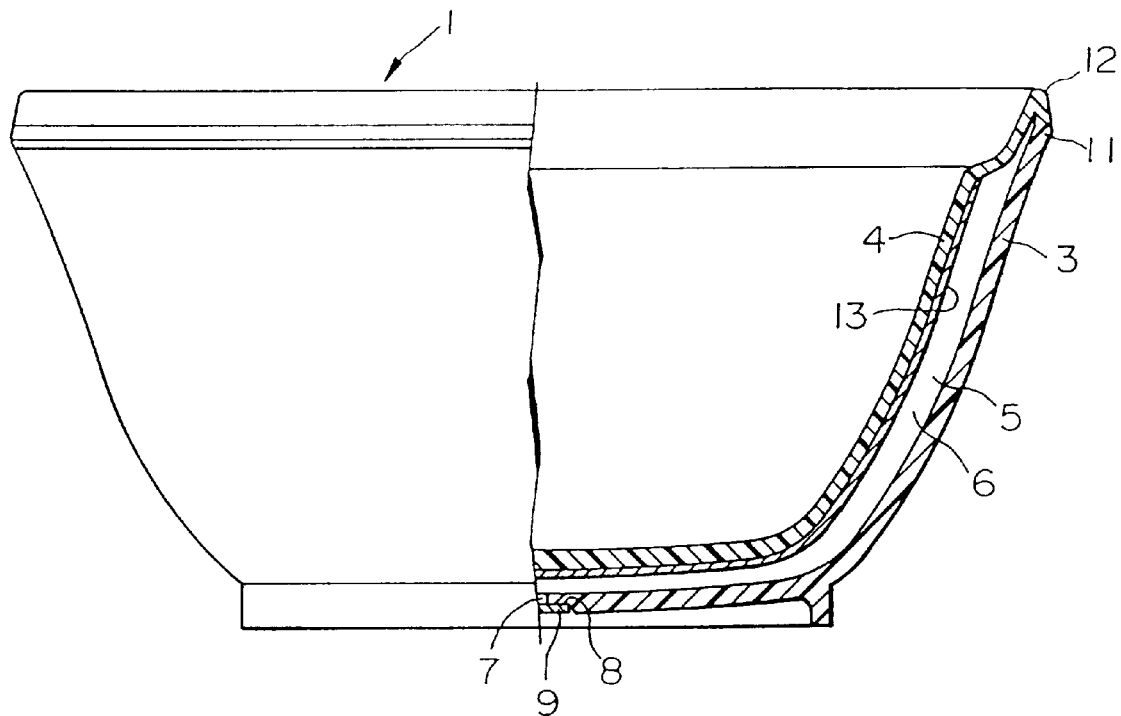
FIG. 1 is a partial cross-sectional diagram illustrating an embodiment of a thermally insulated synthetic resin container of the present invention.
Figure 2:
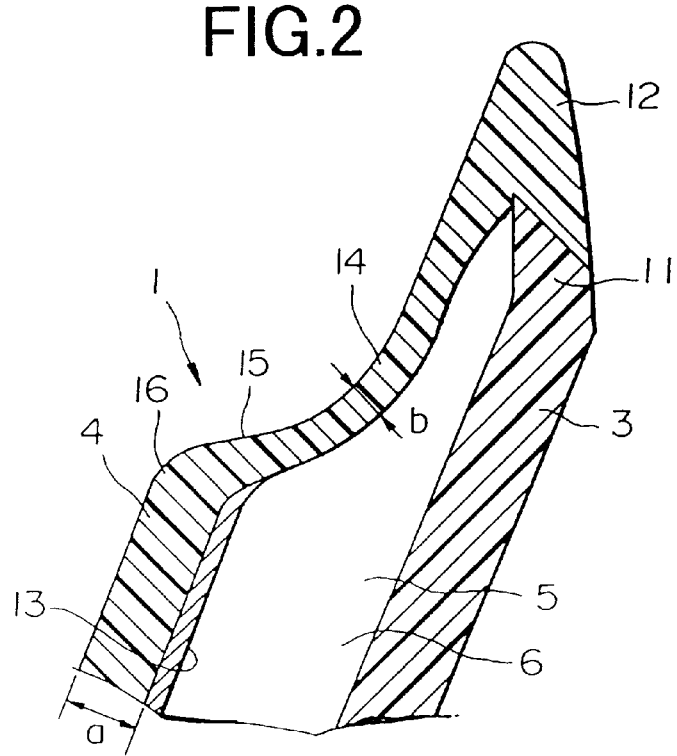
FIG. 2 is a cross-sectional diagram illustrating the vicinity of the mouth portion of a thermally insulated synthetic resin container of the present invention.
Figure 3:
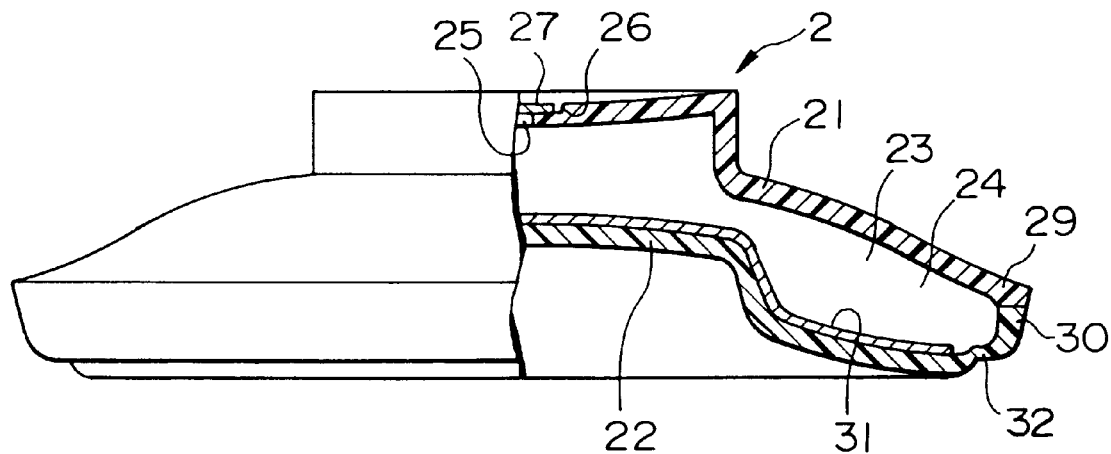
FIG. 3 is a partial cross-sectional diagram illustrating an embodiment of a thermally insulated synthetic resin lid of the present invention.
Figure 4:
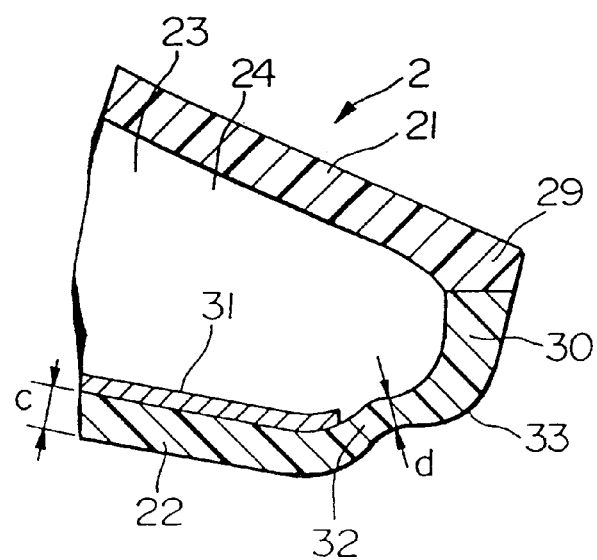
FIG. 4 is a cross-sectional diagram illustrating the vicinity of the peripheral portion of a thermally insulated synthetic resin lid of the present invention.

FIG. 1 and FIG. 2 illustrate a preferred embodiment of a thermally insulated container 1 of the present invention, while FIG. 3 and FIG. 4 illustrate a preferred embodiment of a thermally insulated lid 2 of the present invention. The thermally insulated lid 2 is made to fit on and completely close the thermally insulated container 1.

This container 1 preferably comprises a polycarbonate resin which is both heat resistant and water resistant, a polypropylene resin, a polyester resin, or an ABS resin, more preferably comprises such mixed resin comprising a polycarbonate and a polyester with a 7:3 ratio, comprises an outer container 3 and an inner container 4 formed by a method such as injection molding, comprising a space portion 5 between the inner and outer containers which is the thermally insulating layer 6, comprises a double walled structure, and has the shape of a China bowl or a wooden bowl.

A mixed resin comprising a polycarbonate and a polyester with a 7:3 ratio used in the molding of the container 1 results in a high chemical resistance, which can prevent the generation of solvent cracks due to solvents contained in paints used in the forming of the metal plating membrane or the generation of cracks due to the contents, detergents, bleaches and the like during normal use, and is therefore desirable. This resin has excellent gas barrier properties which make it desirable especially when filling gas having low thermal conductivity into the thermally insulating layer 6. Here, polyester includes polyethylene terephthalate, polybutylene terephthalate, and polyethylene naphthalate.

In the center of the bottom portion of the outer container 3, a through hole 7 is formed. And in the periphery of the through hole 7, an indented portion 8 is formed on the outer surface side of the outer container 3 with the through hole 7 as its center and forms the shape of concentric circles. This indented portion 8 is intended for fitting and adhering a sealing plate 9, and therefore the depth of the indented portion 8 is formed to be identical to the thickness of the sealing plate 9, which is formed by resin identical to those of the inner and outer containers. By means of this type of structure, when the container 1 is completely assembled, it is possible to make the part of the through hole 7 portion of the container 1 be flat, and the appearance and handling are excellent, and cleaning is simple.

The through hole 7 is provided on the bottom portion of the outer container 3, and with respect to the manufacturing process of the container 1, after the inner and outer containers are joined to form a double wall structured container, the through hole 7 is used as a discharge hole and an inlet to replace the existing gas with a gas having low thermal conductivity, and after the filling of gas, the through hole 7 is sealed with an adhesive agent. Although the embodiment illustrated in FIG. 1 illustrates an embodiment which provides, in the outer container 3, an indented portion 8 with a through hole 7 formed in the center, as an alternative, the indented portion 8 with a through hole 7 formed in the center may be provided in the inner container 4. However, taking into consideration the production efficiency in the manufacturing process and the appearance, it is usually formed in the center of the bottom portion of the outer container 3.

The outer container 3 and the inner container 4 are joined at their respective mouth portions 11 and 12 by a method such as vibration welding or spin welding to form a container having a double wall structure. Since the joining is conducted by means of vibration welding or spin welding, the tightness of the seal of the joint between the inner and outer containers is high and the joint strength is also large.

It is desirable to fill the thermally insulating layer 6 formed between the outer container 3 and the inner container 4 with at least one type of gas having low thermal conductivity selected from among xenon, krypton, and argon. The thermal conductivities of these gases are as follows: xenon ($k=0.52 \times 10^{-2}$ W·m$^{-1}$·K$^{-1}$; 0° C.); krypton ($k=0.87 \times 10^{-2}$ W·m$^{-1}$·K$^{-1}$; 0° C.); and argon ($k=1.63 \times 10^{-2}$ W·m$^{-1}$·K$^{-1}$; 0° C.). And their thermal conductivities are lower than that of air ($k=2.41 \times 10^{-2}$ W·m$^{-1}$·K$^{-1}$; 0° C.), and it is possible to use these gases singly or as a mixed gas comprising two or more of these gases. By means of using these gases having low thermal conductivities, it is possible to obtain a container with high thermally insulating performance capabilities.

The through hole 7 is sealed by means of fitting and adhering the sealing plate 9 onto the indented portion 8 of the outer container 3. More specifically, after the through hole 7 is sealed with a cyanoacrylate type adhesive agent, the sealing plate 9 is applied with the cyanoacrylate type adhesive agent and fitted and adhered onto the indented portion 8 of the outer container 3, thereby the sealed portion is protected from the outside environment. Additionally, because the sealing plate 9 is to be fitted and sealed onto the indented portion 8, the placement position of the sealing plate 9 can be easily determined during the manufacture of the double wall structured container, and an incorrect placement of the sealing plate 9 will not occur.

On the surfaces of the inner container 4 and the outer container 3 which are facing the space portion 5, it is desirable to provide a metallic foil 13 as a thermal radiation preventing material at least on the surface of the inner container 4. By this means, the thermal radiation heat transfer of the thermally insulated container can be suppressed. Furthermore, by providing a metallic foil on the inner surface of the outer container 3 (not shown in diagram), the thermal radiation heat transfer can be further reduced.

For the metallic foil 13, aluminum foil, copper foil, silver foil, or the like are used, and they can be applied inexpensively and easily by means of an adhesive agent or a double sided adhesive tape. As an alternative, a metal deposition tape can also be used.

In the vicinity of the mouth portion 12 of the inner container 4, a reduced thermal conductive portion 14 having a wall of reduced thickness is formed, as illustrated in FIG. 1 and FIG. 2. In this embodiment, a step portion is formed in the inner container 4. The gradient is reduced at the top surface 15 of this step portion, and by reducing the thickness of the inner container, the reduced thermal conductive portion 14 is formed. Furthermore, the inner wall side draws a concave surface in the upward direction (the thermally insulating surface side draws a convex surface) and increases the gradient once again, and reaches the mouth portion 12 which forms the rim of the container. This mouth portion 12 is joined with the mouth portion 11 of the outer container 3.

The thickness a of the part other than the reduced thermal conductive portion 14 of the inner container 4 is determined by the size, the weight, and the thermal conduction performance capabilities, which are required for thermally insulated containers. This thickness a is preferably made to be 1.5–4.0 mm, and more preferably made to be 2.0–3.0 mm. On the other hand, the minimum thickness b of the reduced thermal conductive portion 14 is determined by balancing its strength and its reduced thermal conductive effects, and is preferably made to be 0.5–2.0 mm, and more preferably made to be 1.0–2.0 mm. If the minimum thickness b of the reduced thermal conductive portion 14 is thinner than 0.5 mm, then there is a possibility that the necessary strength for the container 1 will be lost.

Because this reduced thermal conductive portion 14 can be formed during the injection molding process of the inner container 4, its formation is easy and there will be no increase in the number of processes. Additionally, since the amount of synthetic resin necessary in the formation of the inner container 4 is reduced, there will be no increase in the manufacturing cost, the same being true in the case of the formation of the reduced thermal conductive portion 14.

In addition, by forming the reduced thermal conductive portion 14 to fit the convex surface shape of the periphery of the bottom surface wall of the lid of the container, it is possible to have a surface to surface contact between the thermally insulated container 1 and the thermally insulated lid 2, thereby stabilizing the engagement with the thermally insulated lid 2, and increasing the tightness of the seal between the thermally insulated container 1 and the thermally insulated lid 2.

In addition, during normal use of the thermally insulated container 1, the corner portion 16 of the step portion becomes a mark indicative of the upper limit for the contents. Therefore, it is possible to prevent the overflowing the contents from the thermally insulated container 1 when the lid is placed thereon, and to prevent losing the reduced thermal conductive effects due to the contents coming in contact with the reduced thermal conductive portion 14.

Furthermore, when adhering the metallic foil 13 as a thermal radiation preventing material onto the surface of the thermally insulating layer 6 side of the inner container 4, by determining the position of the metallic foil 13 in the vicinity of the bottom end of the convex surface of the thermally insulating layer 6 side of the reduced thermal conductive portion 14, the fixed placement of the metallic foil 13 is easy, and it is possible to prevent thermal conduction loss from the mouth portion 12 of the container via the metallic foil.

FIG. 3 and FIG. 4 illustrate a preferred embodiment of a thermally insulated lid 2 which covers by engaging with the mouth portion of the container 1. This lid 2 preferably comprises a polycarbonate resin which is both heat resistant and water resistant, a polypropylene resin, a polyester resin, or an ABS resin, more preferably comprises such mixed resin comprising a polycarbonate and a polyester with a 7:3 ratio, comprises a top surface wall 21 and a bottom surface wall 22 formed by a method such as injection molding, comprising a space portion 23 between the top and bottom surface walls which is the thermally insulating layer 24, comprises a double walled structure, and has the shape of hat.

A mixed resin comprising a polycarbonate and a polyester with a 7:3 ratio used in the molding of the thermally insulated lid 2 results in a high chemical resistance, which can prevent the generation of solvent cracks due to solvents contained in paints used in the forming of the metal plating membrane or the generation of cracks due to the contents, detergents, bleaches and the like during normal use, and is therefore desirable. This resin has excellent gas barrier properties which make it desirable especially when filling gas having low thermal conductivity into the thermally insulating layer 24. Here, polyester includes polyethylene terephthalate, polybutylene terephthalate, and polyethylene naphthalate.

In the center of the top surface wall 21, a through hole 25 is formed. And in the periphery of the through hole 25, an indented portion 26 is formed on the upper surface side of the top surface wall 21 with the through hole 25 as its center and forms the shape of concentric circles. This indented portion 26 is intended for fitting and adhering a sealing plate 27, and therefore the depth of the indented portion 26 is formed to be identical to the thickness of the sealing plate 27, which is formed by resin identical to those of the top and bottom surface walls. By means of this type of structure, it is possible to make the through hole 25 portion on the top surface wall portion of the thermally insulated lid 2 be flat, and the appearance and handling are excellent, and cleaning is simple.

With respect to the manufacturing process of the thermally insulated lid 2, after the top and bottom surface walls are joined to form a double wall structured lid, the through hole 25 is used as a discharge hole and an inlet to replace the existing gas with a gas having low thermal conductivity, and after the filling of gas, the through hole 25 is sealed with an adhesive agent. Although the embodiment illustrated in FIG. 3 illustrates an embodiment which provides, on the top surface wall 21, an indented portion 26 with a through hole 25 formed in the center, as an alternative, the indented portion 26 with a through hole 25 formed in the center may be provided on the bottom surface wall 22.

The thermally insulated lid 2 is joined as a single body at the peripheral portions 29, 30 of the top and bottom surface walls 21, 22 while leaving a space portion 23 between the top surface wall 21 and the bottom surface wall 22. They are joined to form a lid having a double walled structure by a method such as vibration welding or spin welding. Since the joining is conducted by means of vibration welding or spin welding, the tightness of the seal of the joint is high and the joint strength is also large.

The thermally insulating layer 24 formed between the top surface wall 21 and the bottom surface wall 22 is filled with at least one type of gas having low thermal conductivity selected from among xenon, krypton, and argon. The thermal conductivities of these gases are lower than that of air, and it is possible to use these gases singly or as a mixed gas comprising two or more of these gases. By means of using these gases having low thermal conductivities, it is possible to obtain a thermally insulated lid 2 with high thermally insulating performance capabilities.

The through hole 25 is sealed by means of fitting and adhering the sealing plate 27 onto the indented portion 26 of the top surface wall 21. More specifically, after the through hole 25 is sealed with a cyanoacrylate type adhesive agent, the sealing plate 27 is applied with the cyanoacrylate type adhesive agent and fitted and adhered onto the indented portion 26 of the top surface wall 21, thereby the sealed portion is protected from the outside environment. Additionally, because the sealing plate 27 is to be fitted and sealed onto the indented portion 26, the placement position of the sealing plate 27 can be easily determined during the manufacture of the double wall structured lid, and an incorrect placement of the sealing plate 27 will not occur.

On the surfaces of the top surface wall 21 and the bottom surface wall 22 which are facing the space portion 23, a metallic foil 31 is provided as a thermal radiation preventing material at least on the surface of the bottom surface wall 22, and by this means, the thermal radiation heat transfer of the thermally insulated lid can be suppressed. Furthermore, by providing a thermal radiation preventing material on the surface of the top surface wall 21 (not shown in diagram), the thermal radiation heat transfer can be further reduced.

For the metallic foil 31, aluminum foil, copper foil, silver foil, or the like are used, and they can be applied inexpensively and easily by means of an adhesive agent or a double sided adhesive tape. As an alternative, a metal deposition tape can also be used.

In the vicinity of the peripheral portion 30 of the bottom surface wall 22, a reduced thermal conductive portion 32 having a wall of reduced thickness is formed, as illustrated in FIG. 3 and FIG. 4. In this embodiment, by reducing the thickness of the bottom surface wall 22, the reduced thermal conductive portion 32 is formed as an indented portion on the part which corresponds to the bottom corner of the peripheral portion of the thermally insulated lid 2. It then further extends upward and forms the peripheral portion 30 of the bottom surface wall 22, and this peripheral portion 30 of the bottom surface wall 22 is joined with the peripheral portion 29 of the top surface wall 21.

The thickness c of the part other than the reduced thermal conductive portion 32 of the bottom surface wall 22 is determined by the size, the weight, and the thermal conduction performance capabilities, which are required for thermally insulated lids. This thickness a is preferably made to be 1.5–4.0 mm, and more preferably made to be 2.0–3.0 mm. On the other hand, the minimum thickness d of the reduced thermal conductive portion 32 is determined by balancing its strength and its reduced thermal conductive effects, and is preferably made to be 0.5–2.0 mm, and more preferably made to be 1.0–2.0 mm. If the minimum thickness d of the reduced thermal conductive portion 32 is thinner than 0.5 mm, then there is a possibility that the necessary strength for the thermally insulated lid 2 will be lost.

Because this reduced thermal conductive portion 32 can be formed during the injection molding process of the bottom surface wall 22, its formation is easy and there will be no increase in the number of processes. Additionally, since the amount of synthetic resin necessary in the formation of the bottom surface wall 22 is reduced, there will be no increase in the manufacturing cost, the same being true in the case of the formation of the reduced thermal conductive portion 32.

In addition, by forming the protruding surface 33 which extends from the reduced thermal conductive portion 32 of the bottom surface wall 22 to the peripheral portion 30 into a shape which will fit on the vicinity of the mouth portion of the inner container 4, for example, on the indented surface of the inner wall side of the reduced thermal conductive portion 14 in the case of the container 1, it is possible to have a surface to surface contact between the thermally insulated container 1 and the thermally insulated lid 2, thereby stabilizing the engagement with the thermally insulated lid 2, and increasing the tightness of the seal between the thermally insulated container 1 and the thermally insulated lid 2.

Furthermore, when adhering the metallic foil 31 as a thermal radiation preventing material onto the surface of the bottom surface wall 22 on the thermally insulating layer 24 side, by avoiding the contact of the metallic foil 31 with the surface of the reduced thermal conductive portion 32 on the thermally insulating layer 24, it is possible to prevent thermal conduction loss from the peripheral portion of the lid via the metallic foil 31, and is therefore desirable. For example, it may be desirable to adjust the diameter of the reduced thermal conductive portion 32 so as not to touch the metallic foil 31, or to have the periphery of the metallic foil 31 be spaced with respect to the surface of the bottom surface wall 22.

EMBODIMENT 1

The thermally insulated container 1 illustrated in FIG. 1 was manufactured.

First, an inner container 4 and an outer container 3 was manufactured by means of injection molding employing mixed resin which mixes a polycarbonate and a polybutylene terephthalate in a 7:3 ratio (rim diameter: 130 mm). The thickness of the reduced thermal conductive portion 14 of the inner container 4 was made to be 1 mm, and the thickness all of the other parts were made to be 2.5 mm. Afterwards, on the outer surface of the inner container 4 (the surface which faces the space portion 5), the position of the ends of an aluminum foil having a thickness of 15 μm were determined at the bottom end portion of the reduced thermal conductive portion 14, and were adhered by means of a double sided adhesive tape.

Next, the end portions of the inner and outer containers 3, 4 were joined as a single body by employing a vibration welding apparatus (not illustrated in diagram), and a container having a double walled structure was created. This container having a double walled structure was, in an upside down position, set over a gas replacing-filling-sealing apparatus, and after the air was evacuated from the space between the two walls, xenon gas was filled here at around atmospheric pressure. Afterwards, using a cyanoacrylate type adhesive agent, the through hole 7 was sealed with the sealing plate 9, and a thermally insulated container 1 was created.

In the same manner, a thermally insulated lid 2 as illustrated in FIG. 3 was manufactured.

First, a top surface wall 21 and a bottom surface wall 22 was manufactured by means of injection molding employing mixed resin which mixes a polycarbonate and a polybutylene terephthalate in a 7:3 ratio. The thickness of the thin portion of the bottom surface wall 22 was made to be 1 mm, and the thickness all of the other parts were made to be 2.5 mm. Afterwards, on the upper surface of the bottom surface wall 22 (the surface which faces the space portion 23), the position of the ends of an aluminum foil having a thickness of 15 μm were made as not to touch the bottom surface wall 22, and were adhered by means of a double sided adhesive adhesive tape.

Next, the end portions of the top and bottom surface walls 21, 22 were joined as a single body by employing a vibration welding apparatus (not illustrated in diagram). By means of a gas replacing-filling-sealing apparatus, this lid having a double walled structure, after having the air evacuated from the space portion 23 between the double walls, was filled with xenon gas in the space portion 23 at around atmospheric pressure. Then, using a cyanoacrylate type adhesive agent, the through hole 25 was sealed with the sealing plate 27, and a thermally insulated lid 2 filled with the xenon gas was created.

EMBODIMENT 2

As indicated in Table 1, excluding the provision of an aluminum foil as a thermal radiation preventing material, a thermally insulated container and a thermally insulated lid were manufactured with identical specifications as that of Embodiment 1.

EMBODIMENT 3

As indicated in Table 1, excluding the joining while maintaining air within the thermally insulating layer without any replace of gas, a thermally insulated container and a thermally insulated lid were manufactured with identical specifications as that of Embodiment 1.

EMBODIMENT 4

As indicated in Table 1, with the specifications of that of Embodiment 3, a thermally insulated container and a thermally insulated lid were manufactured which further do not provide an aluminum foil as a thermal radiation preventing material.

COMPARATIVE EMBODIMENTS 1–4

As indicated in Table 1, Comparative Embodiments 1–4 corresponding to each of the Embodiments 1–4 were created, by manufacturing a thermally insulated container and a thermally insulated lid, without providing a reduced thermal conductive portion, and with all of the other conditions be identical specifications as that of each corresponding Embodiment.

In the thermally insulated containers of Embodiments 1–4 and Comparative Embodiments 1–4, 300 cc of hot water at approximately 95° C. was placed, and in the state where the mouths of the containers were covered with their respective thermally insulated lids. After maintaining that for one hour in a surrounding temperature of 20° C., the temperature of the hot water was measured. The results are included in Table 1.

As indicated in Table 1, when the thermally insulated containers and the thermally insulated lids of Embodiments 1–4 which provide the reduced thermal conductive portions 14, 32 are compared to the thermally insulated containers and the thermally insulated lids of Comparative Embodiments 1–4 which correspond to Embodiments 1–4, and which do not provide the reduced thermal conductive portions 14, 32, it can be seen that the thermal insulation effects of the thermally insulated containers and the thermally insulated lids of Embodiments 1–4 are superior.

In addition, the temperature difference (4° C.) between Embodiment 1 and Comparative Embodiment 1 and the temperature difference (3° C.) between Embodiment 2 and Comparative Embodiment 2 exceeds the temperature difference (1° C.) between Embodiment 3 and Comparative Embodiment 3 and the temperature difference (1° C.) between Embodiment 4 and Comparative Embodiment 4. From this fact, it can be seen that there is a marked influence exerted in the thermal conduction loss reduction effects due to the presence of the reduced thermal conductive portions 14, 32 of the present invention by filling the thermally insulating layer of the thermally insulated container and the thermally insulated lid with xenon (Embodiments 1 and 2, and corresponding Comparative Embodiments 1 and 2) more than by filling the thermally insulating layer with air (Embodiments 3 and 4, and corresponding Comparative Embodiments 3 and 4).

Especially in the case of Embodiment 1, which in addition to filling the thermally insulating layers 6, 24 with xenon gas and providing an aluminum foil as a thermal radiation preventing material, forms the reduced thermal conductive portions 14, 32, the temperature of the hot water after one hour was 77° C. Embodiment 1 possesses desirable heat retaining performance capabilities, and shows that the more the thermal conduction loss from the main body is reduced, the greater the effects of the present invention.

TABLE 1

| | THERMALLY INSULATED CONTAINER | | | THERMALLY INSULATED LID | | | | |
|---|---|---|---|---|---|---|---|---|
| | REDUCED THERMAL CONDUCTIVE PORTION | FILLED GAS | ALUMINUM FOIL | REDUCED THERMAL CONDUCTIVE PORTION | FILLED GAS | ALUMINUM FOIL | TEMPERATURE OF HOT WATER AFTER 1 HOUR ° C. | DIFFERENCE IN TEMPERATURE ° C. |
| EMBODIMENT 1 | YES | XENON | YES | YES | XENON | YES | 77 | 4 |
| COMPARATIVE EMBODIMENT 1 | NO | XENON | YES | NO | XENON | YES | 73 | |
| EMBODIMENT 2 | YES | XENON | NO | YES | XENON | NO | 69 | 3 |

TABLE 1-continued

| | THERMALLY INSULATED CONTAINER | | | THERMALLY INSULATED LID | | | | |
|---|---|---|---|---|---|---|---|---|
| | REDUCED THERMAL CONDUCTIVE PORTION | FILLED GAS | ALU- MINUM FOIL | REDUCED THERMAL CONDUCTIVE PORTION | FILLED GAS | ALU- MINUM FOIL | TEMPERATURE OF HOT WATER AFTER 1 HOUR ° C. | DIFFERENCE IN TEMPERATURE ° C. |
| COMPARATIVE EMBODIMENT 2 | NO | XENON | NO | NO | XENON | NO | 66 | |
| EMBODIMENT 3 | YES | AIR | YES | YES | AIR | YES | 64 | 1 |
| COMPARATIVE EMBODIMENT 3 | NO | AIR | YES | NO | AIR | YES | 63 | |
| EMBODIMENT 4 | YES | AIR | NO | YES | AIR | NO | 60 | 1 |
| COMPARATIVE EMBODIMENT 4 | NO | AIR | NO | NO | AIR | NO | 59 | |

INDUSTRIAL APPLICABILITY

Since the thermally insulated synthetic resin container and the thermally insulated synthetic resin lid forms a reduced thermal conductive portion having a wall of reduced thickness in the vicinity of the mouth portion of the inner container or in the vicinity of the peripheral portion of the bottom surface wall, it is possible to reduce the thermal conduction loss from the mouth portion of the inner container or the thermal conduction loss from the peripheral portion of the lid. Accordingly, even in the case for a thermally insulated container having a wide mouth, it is possible to provide desirable thermally insulating performance capabilities.

The reduced thermal conductive portion of the above structure can be formed during the injection molding process of the inner container or the bottom surface wall, and its formation is easy, so there will be no need to increase the number of manufacturing processes, and additionally, since the amount of synthetic resin necessary in the formation of the inner container or the bottom surface wall is reduced, there will be no increase in the manufacturing cost, the same being true in the case of the formation of the reduced thermal conductive portion.

Furthermore, since the thickness of the reduced thermal conductive portion is thin, the pliability of the vicinity of the mouth portion of the inner container or the vicinity of the peripheral portion of the bottom surface wall is high, and the following advantages are gained during the manufacturing process and during normal use.

Conventionally, when welding the inner container to the outer container or the top surface wall to the bottom surface wall, if their overlaying positions are misaligned, it will result in defective joints. Therefore, the management of their overlaying positions was necessary. However, according to the thermally insulated container and the thermally insulated lid of the present invention, even if a slight misalignment occurs in the overlaying positions of the inner container and the outer container or the top surface wall and the bottom surface wall, it can be absorbed by the resilience of the reduced thermal conductive portions, thereby facilitating the management of the welding process.

Additionally, when the thermally insulated container is exposed to high temperatures during such washings as with a dish washer, deformations due to increasing inner pressures of the thermally insulating layers can be absorbed by the resilience of the reduced thermal conductive portions.

Additionally, by filling the thermally insulating layers of the thermally insulated container or the thermally insulated lid with a gas having low thermal conductivity and having thermal conductivity lower than that of air, the thermal conduction loss reducing effects of the reduced thermal conductive portion of the present invention can be heightened.

Furthermore, by providing a metallic foil on the surfaces which face the thermally insulating layers of the inner container or the bottom surface wall other than the reduced thermal conductive portion, in addition to the thermal radiation preventing effects of the metallic foil, effects to prevent thermal conduction loss from the mouth portion or the peripheral portions of the bottom surface wall via the metallic foil can be obtained.

What is claimed is:

1. A thermally insulated synthetic resin container comprising:

an inner container and an outer container, which are both comprised of synthetic resin, and which are both connected at the respective mouth portions thereof while providing a space portion in between said two containers;

a thermally insulating layer, which is the space portion between said inner container and said outer container; and a reduced thermal conductive portion, which has a reduced thickness, and which is formed on the wall in the vicinity of the mouth portion of said inner container.

2. A thermally insulated synthetic resin container in accordance with claim 1, wherein said thermally insulating layer is filled with gas having low thermal conductivity and having thermal conductivity lower than that of air.

3. A thermally insulated synthetic resin container as in claim 1, further comprising a metallic foil on the surfaces which face said thermally insulating layer of said inner container, excluding the part comprising said reduced thermal conductive portion.

4. A thermally insulated synthetic resin lid comprising:

a top surface wall and a bottom surface wall, which are both comprised of synthetic resin, and which are both connected at the respective peripheral portions thereof while providing a space portion in between said two walls;

a thermally insulating layer, which is the space portion between said top surface wall and said bottom surface wall; and a reduced thermal conductive portion, which has a reduced thickness, and which is formed on the wall in the vicinity of the peripheral portion of said bottom surface wall.

5. A thermally insulated synthetic resin lid in accordance with claim 4, wherein said thermally insulating layer is filled with gas having low thermal conductivity and having thermal conductivity lower than that of air.

6. A thermally insulated synthetic resin lid as in claim 4, further comprising a metallic foil on the surfaces which face said thermally insulating layer of said bottom surface wall, excluding the part comprising said reduced thermal conductive portion.

\* \* \* \* \*